April 22, 1924.
F. KLIN
SAW SHARPENING MACHINE
Filed Jan. 26, 1923
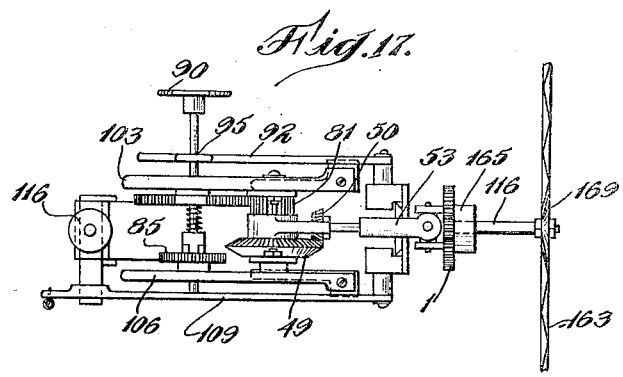
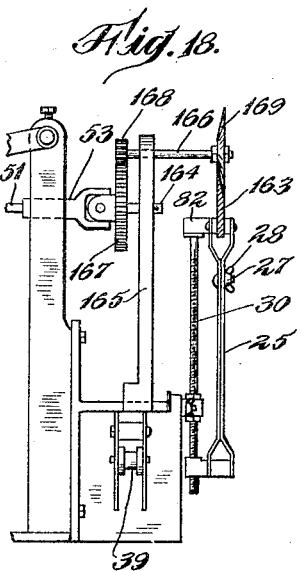
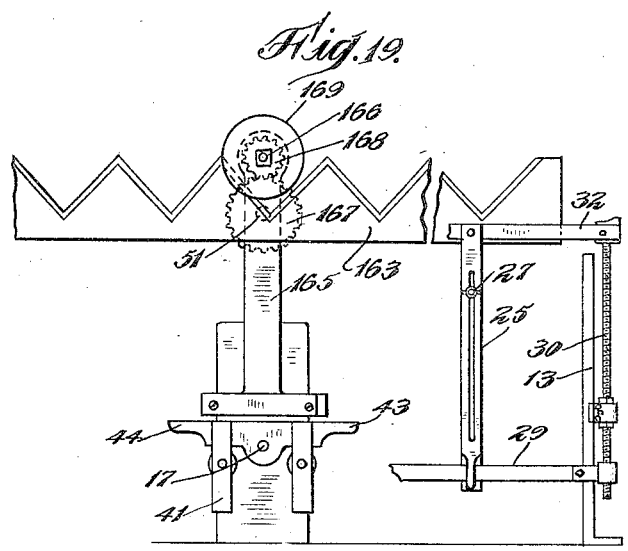
INVENTOR.
Frank Klin
BY
George C. Heinicke
ATTORNEY.

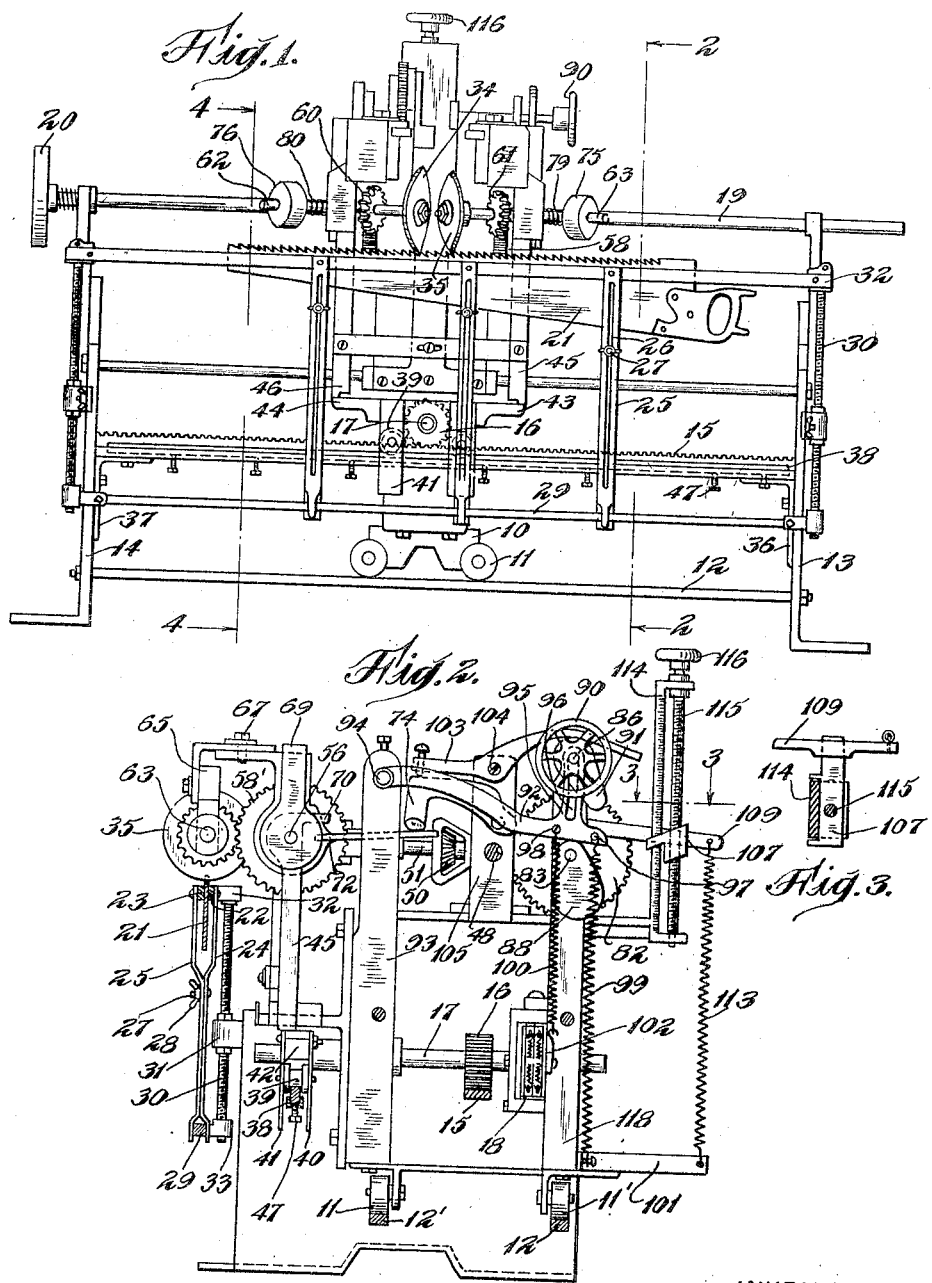

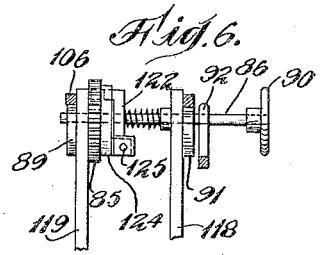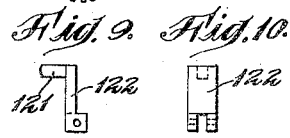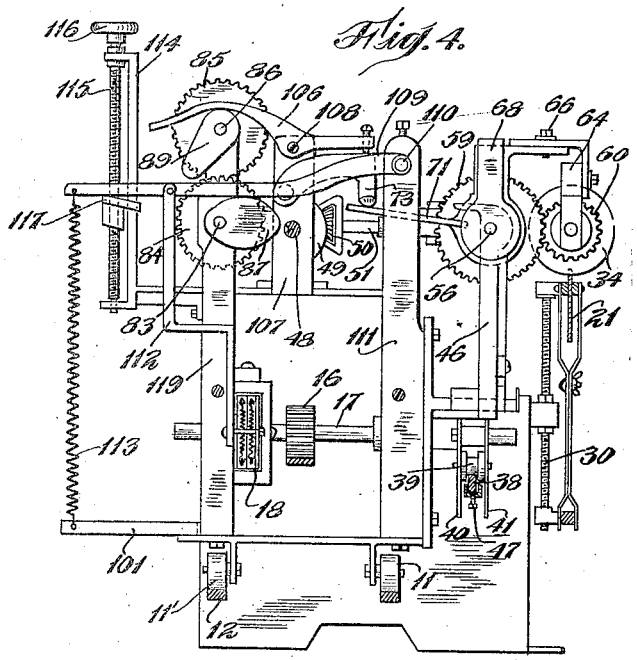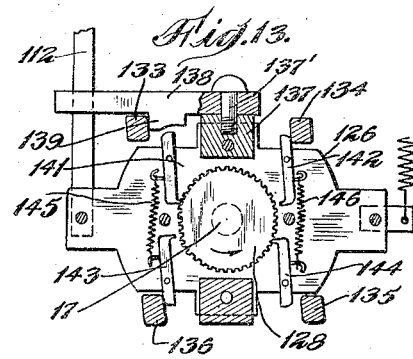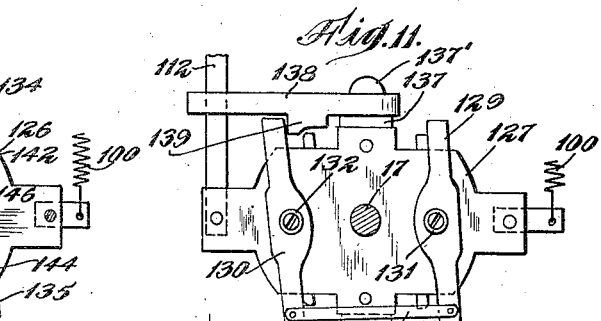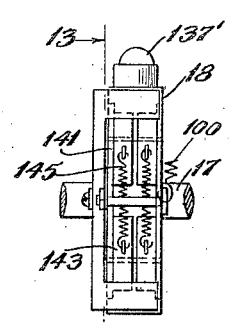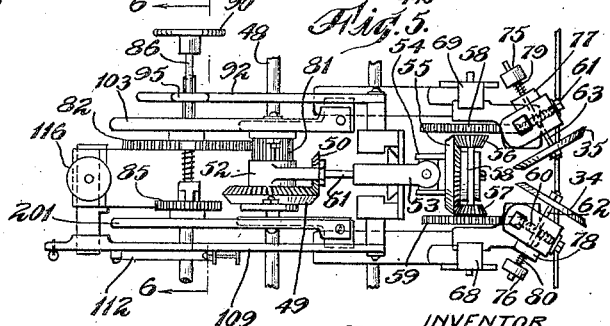

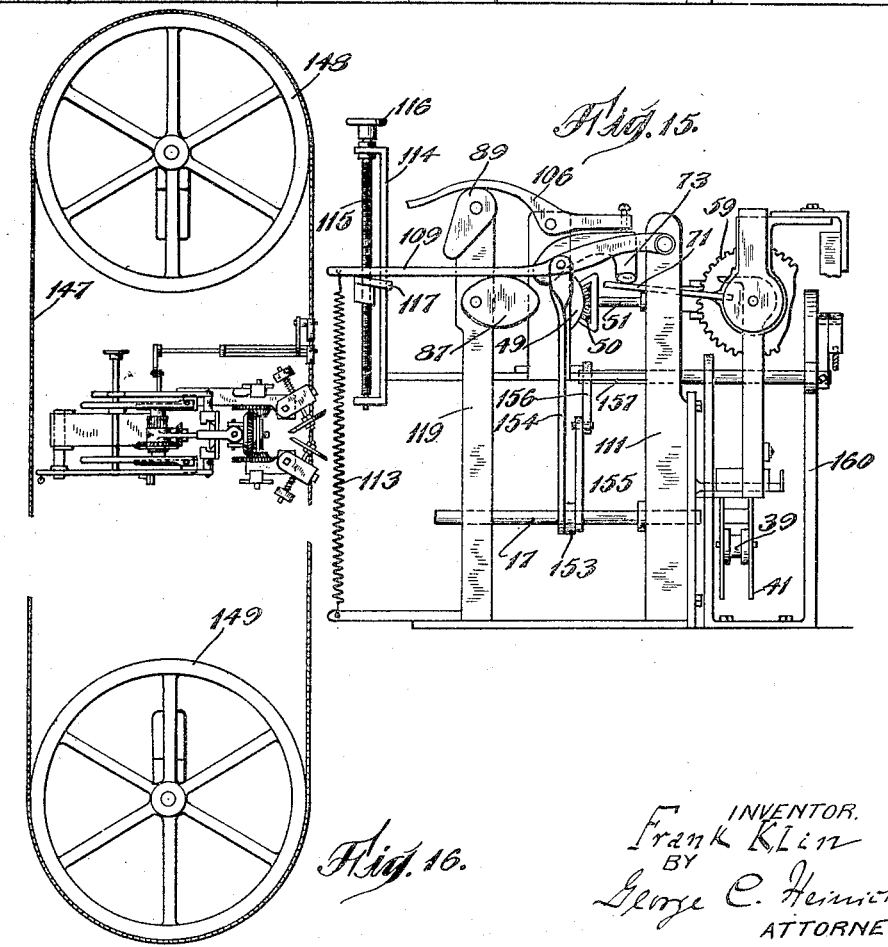

Patented Apr. 22, 1924.

1,491,706

UNITED STATES PATENT OFFICE.

FRANK KLIN, OF FARNUMSVILLE, MASSACHUSETTS.

SAW-SHARPENING MACHINE.

Application filed January 26, 1923. Serial No. 615,153.

*To all whom it may concern:*

Be it known that I, FRANK KLIN, a citizen of Poland, residing at Farnumsville, county of Worcester, and State of Massachusetts, have invented certain new and useful Improvements in Saw-Sharpening Machines, of which the following is a specification.

This invention relates to improvements in saw grinding or filing machines, and it is the principal object of the invention to provide a sharpening machine which can be alternately moved in one or the other direction in a frame to engage with its grinding rollers the teeth of a saw held in said frame.

Another object of the invention is the provision of a machine of this character embodying a motor operated cam mechanism for lifting the sharpening discs over the teeth of the saw.

A further object of the invention is the provision of a machine of this character provided with a clutch mechanism for permitting an operation of the cam mechanism by hand.

A still further object of the invention is the provision of a saw sharpening machine provided with means for gaging the cam operation, and limiting the lifting of said cams to accommodate the machine to saws with teeth of varying depths.

Another object of the invention is the provision of means on such a sharpening machine for adjustably holding a hand saw in position beneath the sharpening tools and for allowing an adjustment of such holding means and for locking the parts in their adjusted positions.

Furthermore my invention relates to improvements in saw sharpening machines, embodying means for the sharpening of teeth of circular band saws and of lawn mowers including means for holding, adjusting and locking these saws in front of or beneath the sharpening tools.

In the accompanying drawings:—

Figure 1 is an end view of my machine illustrating the means for sharpening the teeth of a hand saw, and for feeding and holding the machine and saw.

Figure 2 is a side view of the machine, Figure 1, looking in the direction of arrows 2—2, of Figure 1.

Figure 3 is a detail view of a lever control in section on line 3—3 of Figure 2.

Figure 4 is a side elevation of the machine illustrated in Figure 1, looking in the direction of arrows 4—4 of Figure 1.

Figure 5 is a top plan view of the machine, Figure 4.

Figure 6 is a detail view of a hand lever control and locking device, partly in section on line 6—6 of Figure 5.

Figures 7 to 10 inclusive are detail views of parts of the mechanism shown in Figure 6.

Figure 11 is a front view of a clutch mechanism.

Figure 12 is an end view thereof.

Figure 13 is an inner side view of the clutch mechanism, partly in section on line 13—13 of Figure 12.

Figure 14 is an end view of my improved machine, illustrating the means for sharpening the teeth of a circular band saw, and the feeding means for the latter.

Figure 15 is a side elevation of the machine, Figure 14 looking in the direction of arrows 15—15 of Fig. 14.

Figure 16 is a top plan view of the machine Figure 15.

Figure 17 is a top plan view of my machine when used for sharpening the teeth of grain mowers.

Figure 18 is a fragmentary side view of the machine, Figure 17, and

Figure 19 is an end view thereof.

As illustrated in Figures 1 and 2, my machine comprises a bed 10 on rollers 11, 11', adapted to run on rails 12, 12' between standards 13, 14. A rack bar 15 is provided between standards 13 and 14, the teeth of which are in mesh with the teeth of a gear 16 on a shaft 17 journaled in the frame of the machine.

This shaft 17 receives its rotation through the intermediary of a clutch mechanism 18, to be more fully described hereafter, from a shaft 19 either by means of a pulley 20 adapted to be driven from a motor, or by means of a crank adapted to be secured to the opposite end of shaft 19, in order to move the machine along rail 12 between standards 13 and 14.

The hand saw 21 to be sharpened is held in the machine between clamping blocks 22, 23 at the upper ends of clamp bars 24, 25 provided with longitudinal slots 26 in which set screws 27 travel, adapted to be operated by means of wing nuts 28. The lower ends of clamp bars 24, 25 slide along a bar 29, and a threaded rod or bar 30 guided intermediate its ends through a bracket 31 on the machine frame.

The upper end of bar 30 supports the saw holding bar 32, while its lower end is passed through a socket 33, and thus a regulation of the distance between the saw and the obliquely arranged grinding discs 34 and 35 is possible.

On brackets 36 and 37 secured to the inner faces of standards 13 and 14, a longitudinal bar 38 rests with its ends, the upper edge of which bar is engaged by rollers 39 journaled between pairwise arranged depending lugs 40 and 41 of a bracket 42 movably secured on shaft 17 having laterally extending arms 43 and 44, engaging the lower ends of the vertical bars 45 and 46.

A plurality of set screws 47 engage the bar 38 and allow an adjustment of the inclination of the saw as will be hereinafter more fully described.

As illustrated in Figures 4 to 12, the machine is operated either by a crank or pulley driven by a suitable motor and attached to transversal shaft 48. On this shaft is provided within the machine frame, a bevel gear 49 which is in mesh with a bevel gear 50 on a shaft 51, journaled at one end in a suitable bearing 52 loosely arranged on shaft 51.

The opposite end of shaft 51 carries a claw element or knuckle joint 53 to the free end of which is attached a bracket 54 integral with a bevel gear 55 in mesh with bevel gears 56 and 57 on a shaft 58 journaled in the machine frame. This shaft carries also two gears 58' and 59.

The gears 58 and 59 are in mesh with gears 60 and 61 provided with teeth of a peculiar shape, best illustrated in Figure 1, on shafts 62 and 63 obliquely and movably arranged in cheeks 64 and 65 adjustably secured by means of bolts 66 and 67 to the upper arms of brackets 68 and 69 movably secured by means of their laterally depending pairwise arranged cheek plates to shaft 56.

Between each pair of cheek plates the upper hooked ends 70 (Fig. 2) of bars 45 and 46 are projecting rearwardly. The arms 71 and 72 of brackets 68 and 69 are extended rearwardly and the free ends of the same are engaged by pawls 73 and 74 pivotally secured on the sides of the machine frame and the downward movement of arms 71 and 72, brackets 68 and 69, and the cheeks 64 and 65, all turning around shaft 56, is limited by the engagement of the upper inner wall of the upper arms of brackets 68 and 69 with the upper faces of hooks 70.

The obliquely arranged shafts 62 and 63 carry at their front ends the sharpening discs 34 and 35, and at their rear ends collars 75, 76, and between these collars and suitable washers 77 and 78 provided on shafts 62 and 63, springs 79 and 80 are wound around the shafts 61 and 63.

The shaft 48 carries laterally disposed to bearing 52 within the machine frame a gear 81 secured thereto and in mesh with a gear 82 on cam shaft 83, which also carries with the machine frame a gear 84 (Fig. 4) in mesh with a gear 85 on a shaft 86.

The cam shaft 83 carries at one of its ends, outside of the machine frame a cam 87 (Fig. 4) and at its opposite end, also on the outside of the machine frame a cam 88 (Fig. 2), while shaft 86 carries at one end on the outside of the machine frame a cam 89, and at its opposite end a hand wheel 90, and a cam 91 (Figs. 2–6) intermediary its ends.

A lever arm 92 is pivotally secured to a post 93 of the machine frame as at 94 and has near its rear ends a projection 95 provided with a longitudinal slot 96 through which shaft 86 is guided to allow a movement of arm 92 up and down.

To screws 97, 98 in the outside face of arm 92 the upper ends of springs 99 and 100 are fastened, and the lower end of spring 99 is fastened to a bracket 101, while the lower end of spring 100 is fastened to a spring 102 protruding from clutch casing 18.

Upon pawl 74 rests one end of a lever arm 103, pivotally secured intermediate its ends as at 104 to the machine frame part 105, while its curved rear end rests on top of cam 91.

On the opposite side of the machine an arm 106 is pivotally secured intermediate its ends to the machine frame part 107 as at 108, and its free, curved rear end rests on top of pawl 89, while its front end engages the top of pawl 73.

A lever arm 109 is pivoted at its front end, as at 110, to the machine post 111, while its rear end rests on pawl 87. Near the front end of lever arm 109 is attached thereto the upper end of an angular arm 112 (Fig. 4), the lower end of which is pivotally attached to a projecting element of clutch 18.

To the rear end of lever arm 109 is secured the upper end of a spring 113, the lower end of which is attached to bracket 101, and a bracket 114 secured to the machine frame carries an adjusting screw 115, the lower end of which is journaled in the lower arm of bracket 114, while its opposite end is extended through the upper arm of bracket 114 and carries a hand wheel 116.

Intermediate its ends the screw 115 carries an abutment 117 on which arm 109 rests, and by means of which the movement of this arm in vertical direction may be limited.

The shaft 86 is journaled in posts 118, 119 of the machine frame, and wheel 85 on this shaft is provided with a slot 120 in its face, into which engages the finger 121 of a clutch member 122, which also passes through a recess 123 of a disc 124 on shaft 86 by the side of gear 85. The lower end of member 122 has two lugs by means of which it is pivotally secured to a boss or disc 124 as at 125.

The clutch 18 for changing the direction of travel of the machine on rack bar 15 comprises two members or plates 126 and 127 secured to shaft 17, and between both plates a gear wheel 128 is keyed to shaft 17.

To the outer face of plate 127 two arms 129 and 130 are pivotally secured intermediate their ends as at 131 and 132, the angular upper and lower ends of which, 133, 134, 135 and 136 grip over the plate 126 as best shown in Figure 13. The plate 127 also carries a boss 137 on which one end of a lever 138 is pivotally secured by a pin 137' which is provided on its lower face intermediary its ends with an abutment or shoulder 139 adapted to engage either the upper end of 129 or of arm 130 as the case may be.

The lower ends of arms 129 and 130 are coupled by a bar 140.

To the inner faces of plate 127 and 126, pairwise arranged pawls 141, 142, 143, 144 are pivotally secured near one of their ends having hooked ends adapted to engage the teeth of gear wheel 128, while pairs of springs 145, 146 connect the pairs of pawls 141, 143 and 142, 144 respectively.

Figures 14, 15 and 16 illustrate the machine as it is used for sharpening circular band saws.

The band saw 147 is guided around two wheels 148, 149 at the upper ends of threaded supporting posts 150, the lower ends of which are guided through brackets 151 secured to the floor or machine bed to allow an adjustment in vertical direction to and from the grinding or sharpening discs or tools 34 and 35, they are locked in their adjusted position by means of nuts 152.

A device is provided for allowing a step by step feeding of the saw past the grinding tools, and this device comprises a transverse bar 153 rotatably secured to shaft 17 to one end of which a vertical bar 154 is pivotally secured at one end, while a shorter vertical bar 155 is pivotally secured to the opposite end of bar 153. The upper end of bar 154 is twisted, flattened, and secured to lever arm 109, while an arm 156 is pivotally secured with one of its ends to the upper end of bar 155, and the opposite end of arm 156 is secured to a shaft 157 carrying a link 158 to the upper end of which a pawl 159 is pivotally secured, adapted to engage the teeth of saw 147. The shaft 157 is journaled in lateral extensions of a U-bracket 160 having an upper extension provided with a slot 161 in which a stop pawl 162 is adjustably secured.

Otherwise the construction of the machine is approximately the same as described above with respect to Figures 1 to 13 from which the features relating to the feeding of the machine in the frame have been omitted.

The form of the machine illustrated in Figures 17–19 is used for sharpening lawn or grain mower blades, as for instance shown at 163.

This saw is held and guided in the same manner as above described with respect to hand saw 21.

The shaft 51 carries element 53 adapted to rotate a stub shaft 164 journaled in a front post 165 of the machine, in which is also journaled a shaft 166 above shaft 164. The shaft 164 carries a gear 167 in mesh with a gear 168 on shaft 166, and the latter shaft carries at its outer end a grinding or sharpening disc 169.

My saw sharpening apparatus operates as follows:

If the operation of the machine by a motor is desired, the shaft 48 is rotated from a motor, so that the grinding or sharpening discs 34, 35 are rotated by the intermediary of bevel gears 49, 50, shaft 51, knuckle 53, bevel gears 55, 56, 57, shaft 58 and gears 58' and 59 which are in mesh with gears 60, 61 having peculiarly formed teeth in order to allow an angular mesh.

These gears 60, 61 are on the shafts 62 and 63 carrying the grinding discs 34 and 35.

On shaft 48 is also provided a gear 81 in mesh with gear 82 on shaft 83, while a gear 84 on shaft 83 on the opposite side of the machine is in mesh with a gear 85 on a shaft 86 journaled in the machine frame above shaft 83 so that shafts 83 and 86 are rotated upon the rotation of shaft 48.

Shaft 83 carries on one side of the machine, cam 87 and on its opposite side cam 88, which engage arms 109 and 92 respectively to elevate the same during the rotation of shaft 83, alternately by bringing the high point of cam 88 into engagement with arm 82 while cam 87 is disengaged from arm 109 and vice versa, and as these arms are connected to the clutch 18, the same will be operated alternately to rotate gear 16 on shaft 17 step by step for feeding the entire machine along rack 15 through the entire frame, in one direction, when arm 138 is swung to engage with its shoulder 133 the angular end 133 of arm 130, and in the opposite direction when said arm 138 is swung about its pivot pin 137' to engage with its shoulder the angular end 134 of arm 129.

On shaft 86, cams 91 and 89 are arranged to simultaneously engage with their higher points the arms 103 and 106 respectively during the rotation of shaft 86. These arms are pivoted intermediate their ends so that during the movement of the cam points along the curved lower faces of these arms their front ends will press against pawls 74 and 73 respectively, which in turn press against arms 72 and 71 respectively, of the brackets 68 and 69 to depress the same as to lift the cheeks 64 and 65 and the grinding tools held thereby out of the saw teeth and lower the same again into engagement with the following teeth to be sharpened.

The operation of the cams are so timed that the feeding of the machine along the rack 15 will be effected simultaneously with the lifting of the grinding tools from the saw, while said grinding or sharpening tools or discs will be operated to sharpen the saw teeth while they are under their own weight in engagement with the saw teeth, and pawls 74 and 73 do not press upon arms 72 and 71.

If it is desired to operate the lifting device for the grinding tools by hand, the clutch illustrated in Figures 6–10 is operated by turning the hand wheel 90 to disengage member 122 from wheel 85, whereupon a continued operation of the hand wheel will operate pawls 89 and 91 in the forementioned manner to operate cams 106 and 103 respectively to lift or lower the grinding tools as the case may be.

If a circular band saw is to be sharpened, the same is fed a step by step motion to pass underneath the grinding discs 34, 35 by means of the lever systems 154, 153, 155, 156, 158 and pawls 159. This lever system is operated by the pawls 87 and 89 adapted to lift arms 109 and 106 respectively, while device 114, 115, 117 allows a regulation of the limit of movement of lever arm 109 by the proper manipulation of hand wheel 116 so as to allow a regulation of the up and downward stroke of the grinding tools in accordance with the depth of the teeth to be sharpened. Such a device is also shown in Figures 2 and 4 for the regulation of the depth of the stroke of the grinding rollers in comparison to the depth of the teeth to be sharpened.

The device illustrated in Figures 17 to 19 inclusive, is intended for the sharpening of the teeth of lawn or grain mowers and its operation will be understood from the drawing without further explanation.

It will be clear that the embodiments of my invention illustrated in the drawings are shown for illustrating the preferred form of my invention as an example of its practical construction, it will however be clear and understood that various changes in the general arrangement of my machine may be made and in the construction of its minor details without departing from the scope and spirit of my invention.

What I claim as new and desire to secure by Letters Patent of the United States is—

1. A saw sharpening machine comprising means for feeding the machine a step by step motion in one and the other direction, including a clutch having two plates, a shaft on which said plates are movably held, a pair of levers pivotally secured intermediate their ends to one of said plates having angular arms gripping under the other plate, a gear secured to said shaft, pairwise arranged pawls adapted to engage said gear to allow a rotation of the same in one direction and a lever on said plates having a shoulder for alternately engaging said pairs of levers to change the direction of rotation of said gear, and shaft, sharpening tools, and means for rotating said sharpening tools, means for lifting said sharpening tools, means for connecting said lifting means to said clutch plates to feed said clutch gear a step by step motion in one direction simultaneously with the step by step feeding of the machine.

2. A saw sharpening machine comprising a frame, a rack bar, a shaft, a gear on said shaft in mesh with said bar, means on said shaft for feeding the machine step by step along said bar in one and the other direction, a pair of rotating sharpening discs, means for elevating said grinding discs during the operation of said step by step feeding means, and for lowering said discs against the work piece, means for rotating said sharpening discs in their lowered position, means for operating said feeding means, and means for adjustably holding a saw in the vicinity of said sharpening discs.

3. In a saw sharpening machine, an operating shaft, a pair of grinding tools, brackets movably mounted on said machine, cheeks carrying said grinding tools adjustably mounted on said brackets, extensions on said brackets, lever arms pivotally mounted intermediate their ends, pawls pivotally secured at their ends adapted to be engaged by said lever arms to depress said extensions or to be disengaged therefrom for raising or lowering said cheeks, a plurality of shafts, a system of gears for rotating said shafts from said operating shaft, a plurality of cams for operating said lever arms to operate said pawls, means for limiting the movement of said arms for allowing a regulation of the grinding tools to fit the varying depths of the saw teeth, a means for allowing an operation of said grinding tools by hand, and a means for adjustably holding a saw in the vicinity of said grinding tools.

4. In a saw sharpening machine including a frame, means for imparting to said machine a step by step motion in said frame, means for regulating the direction of said motion, a pair of grinding tools, means for rotating said tools, means for elevating said tools over the sharpened teeth, a saw holder attached to said frame, a pair of clamps including longitudinal bars for clamping said saw in said holder beneath the grinding tools, a pair of screws supporting said bars and allowing a raising and lowering of the same and the saw, a shaft in said machine, a frame movably attached to said shaft in front of said machine, rollers in said frame, a bar engaging said rollers, a plurality of screws adapted to engage said bars for lifting and lowering said rollers and frame to allow a limited adjustment of the saw blade in its horizontal position, and means for limiting the upward movement of said frame.

5. In a saw sharpening machine including a frame, a system of cams rotatably arranged in said frame, lever arms pivotally secured intermediate their ends to said frame and having curved parts along which said cams glide, a pair of pawls, a pair of brackets having extensions adapted to be engaged and disengaged by said pawls, cheeks adjustably secured to said brackets, grinding tools carried on said cheeks, a shaft transversely arranged in said frame, and carrying two of said system of cams, a hand wheel on said shaft, a power operated shaft, means for transmitting the rotation of said power shaft to said cam shaft, and a clutch on said shaft adapted to be operated by said hand wheel for allowing an operation of said cams from said power shaft and from said hand wheel.

6. In a saw sharpening machine a frame, brackets movably secured at the front of said frame, cheeks adjustably secured to said brackets, a pair of shafts obliquely disposed in said cheeks, a pair of grinding discs carried on said shafts, a pair of gear wheels having peculiarly shaped teeth on said shafts, and means for rotating said gear wheels, shafts and grinding discs upon the operation of said machine.

7. In a saw sharpening machine, a frame, a power shaft journaled in said frame, a bevel gear on said shaft, a bracket on said shaft, a bevel gear on said bracket in mesh with said first named bevel gear, a shaft carrying said bevel gear, a knuckle joint carried at the end of said last named shaft, a large bevel gear adapted to be rotated by said knuckle joint, a transverse shaft, bevel gears on said transverse shaft adapted to be rotated by said large bevel gear, a pair of grinding tools, adjustable cheeks carrying said grinding tools, brackets secured to the machine frame for up and downward movement and carrying said cheeks, obliquely disposed shafts for said grinding tools, gears on said obliquely arranged shafts having peculiar teeth, and a pair of gear wheels on said transverse shaft in mesh with said gears on the obliquely disposed shafts adapted to be rotated upon the operation of said power shaft for rotating said sharpening discs.

8. A saw sharpening machine including a frame, a power shaft in said frame, independently operated pawl and lever arms mounted on opposite sides of said frame, a pair of revolving grinding discs mounted in said frame for up and downward motion, means for limiting the downward movement of said discs, means for limiting said upward movement, a means for imparting to said machine a step by step movement during the operation of said power shaft, a means for reversing said movement, a system of cams for operating said pawl to raise the grinding discs out of the teeth of a saw simultaneously with the operation of said step by step movement imparting means, means for adjustably holding a saw in the vicinity of said tools, means for allowing an adjustment of the movement of said grinding discs to suit the depth of the saw teeth, means for allowing an operation of the machine by hand, and means for adjustably holding a saw beneath said grinding discs.

In testimony whereof I have affixed my signature.

FRANK KLIN.